(No Model.)  2 Sheets—Sheet 1.
M. G. HUBBARD.
CAR TRUCK.
No. 457,740. Patented Aug. 11, 1891.
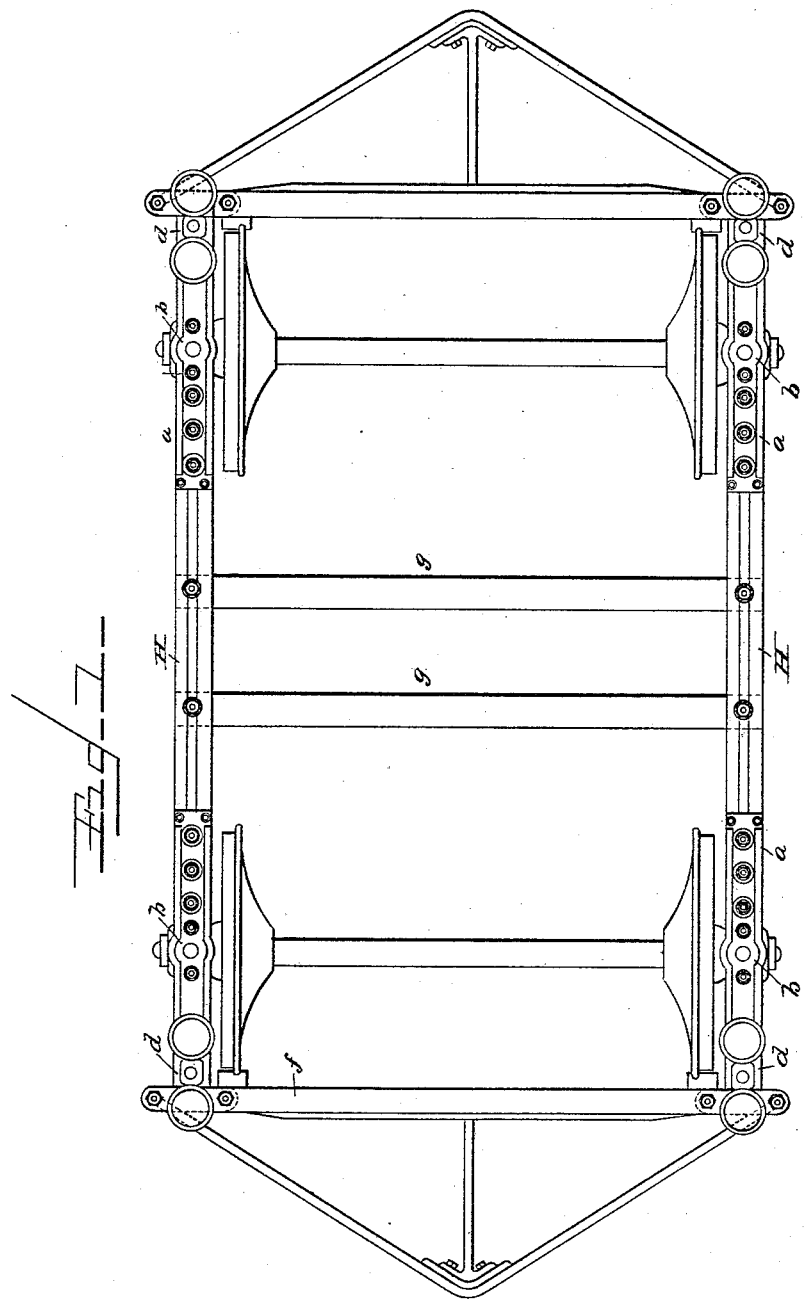
Witnesses=
G. M. Copenhaver
W. T. Robertson
Inventor=
Moses G. Hubbard,
By A. M. Smith & Son
Attorneys (No Model.) 2 Sheets—Sheet 2.
M. G. HUBBARD.
CAR TRUCK.
No. 457,740. Patented Aug. 11, 1891.
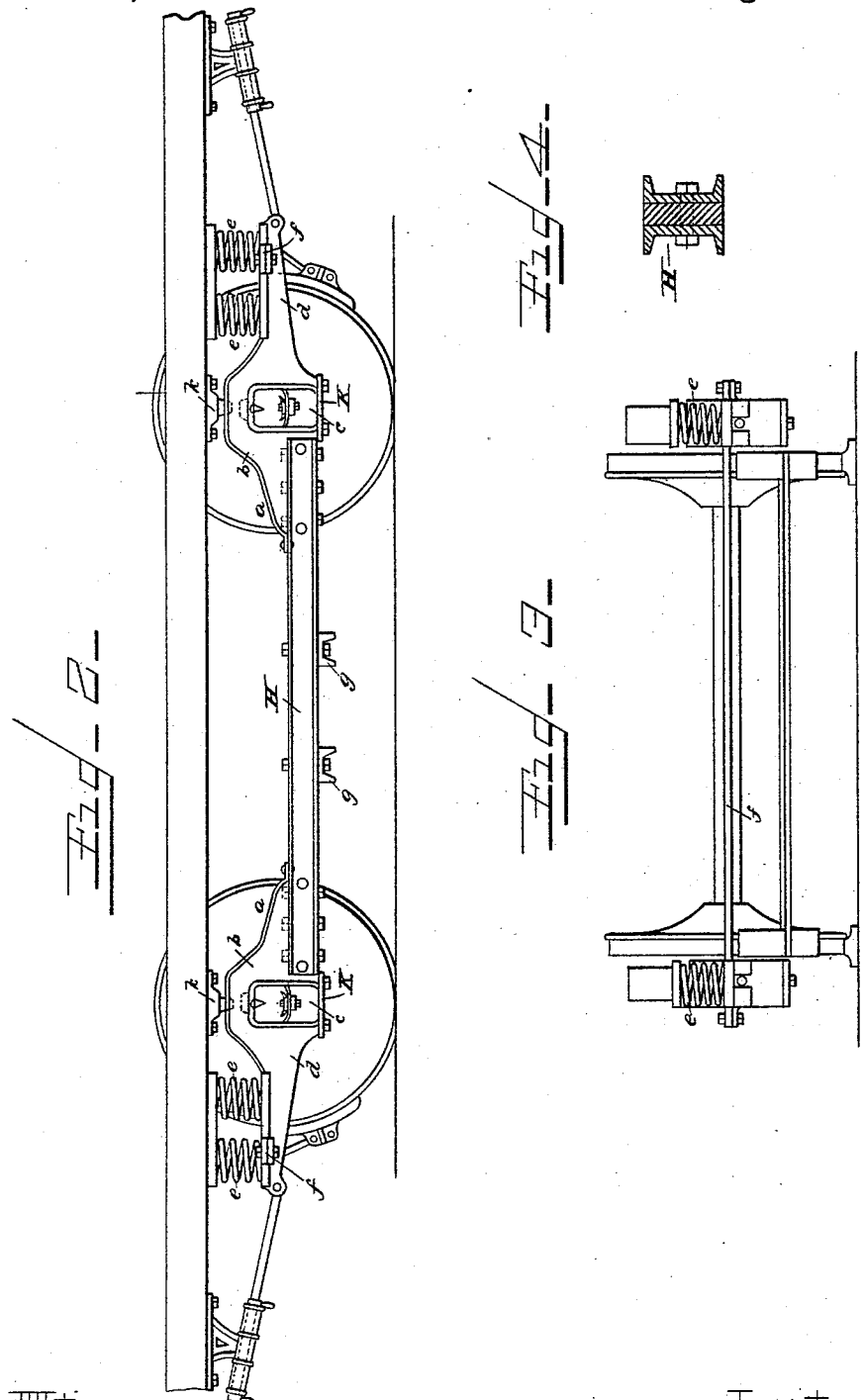

UNITED STATES PATENT OFFICE.

MOSES G. HUBBARD, OF CHICAGO, ILLINOIS.

CAR-TRUCK.

SPECIFICATION forming part of Letters Patent No. 457,740, dated August 11, 1891.

Application filed February 25, 1890. Serial No. 341,675. (No model.)

*To all whom it may concern:*

Be it known that I, MOSES G. HUBBARD, a citizen of the United States, and a resident of Chicago, county of Cook, and State of Illinois, have invented a new and useful Improvement in Car-Trucks, of which the following is a full, clear, and exact description, reference being had to the accompanying drawings, making part of this specification.

My invention consists in certain improvements in the construction of an extended spring-base motor-car truck-frame, and will be understood by reference to the accompanying drawings, forming a part of this specification, in which—

Figure 1 is a plan or top view of a truck embracing my improvements. Fig. 2 is a side view; Fig. 3, an end view thereof, and Fig. 4 a transverse section through one of the I-beam side or wheel pieces connecting the pedestals.

To simplify, strengthen, and cheapen this form of truck and render it more convenient, I locate a wheel-piece H on each side of the truck, which connects at its ends with the pair of pedestals $b\ b$ on that side. These pedestals are adapted by their yoke shape to embrace and hold the car-axle journal-boxes $c\ c\ c\ c$. On the outer ends of these pedestals strong arms $d\ d$ form spring-base extensions, which project outwardly toward the end of the car for supporting the springs $e\ e\ e\ e$, on which the car-body is mounted. At the ends of these arms sockets are formed to receive the ends of the cross-sills $f\ f$, which are firmly secured therein, and I suspend the brakes therefrom, as shown. Central or intermediate cross-sills $g\ g$ are firmly secured to the wheel-pieces and are adapted to carry an electric or other motor. The pedestals and their projecting arms are formed in one piece to give great strength and simplicity.

It is very desirable in an extended-spring base-truck to combine as few pieces as possible in their construction, and the greatest attainable degree of simplicity and strength are required. It is also desirable to have the parts arranged to permit ready side access to the machinery. To attain this object, I employ only one wheel-piece H on each side of the truck, and locate it as low as practicable to admit of ready access to the machinery from the sides of the truck, and to insure the requisite strength these wheel-pieces are each in the form of an I-beam made up, preferably, of two bars of channel-iron or other metal with a wooden center piece or beam between them, as more fully described in my patent dated March 11, 1890, No. 423,158.

The pedestals and their projecting arms are formed, preferably, each in a single piece, in the form shown in Fig. 2, which shows a side view of a pedestal and the arm or spring-base extension on the outer end thereof for supporting the springs.

To relieve the extended spring-base from excessive shocks, I locate the elastic concussion-seats $k\ k$ directly over the journal-boxes, and secure them either to the car-body or to the pedestals. When the wheel-piece is attached to the pedestals by bolts or rivets, I construct the pedestals with strong arms $a\ a$, extending inwardly therefrom and formed to fit the end of the wheel-pieces shown at H H in Fig. 2.

The journal-box $c$ is secured in the yoke of the pedestal by a strap K under the said journal-box, and attached by a bolt and nut at each end of said strap. This is a convenient plan for readily removing or replacing an axle and wheels.

By constructing my motor truck-frame as above described and shown a safe construction of the long spring-base to carry a long car-body steadily is obtained, with a short wheel-base to curve easily at street-corners, and by the arrangement of the spring-bases and springs for the support of the car-body, as described, it will be seen that while the car-body is supported directly on the springs mounted on the outer end extension of the pedestals no part of the weight thereof is thrown upon the wheel-pieces or central portions of the side sills, a valuable feature of the construction described, as giving greatly increased rigidity to the truck-frame.

Having described my invention, what I claim as new, and desire to secure by Letters Patent, is—

1. The combination, with the single wheel-piece on each side, of yoke-pedestals having each a spring-base on its outer end only, formed integral with said pedestal and adapted to receive the springs supporting the car-body mounted directly thereon, said yoke-pedestals being constructed to embrace and hold the journal-boxes and permit their removal from the lower ends of the yokes thereof, substantially as described.

2. A yoke-pedestal having a spring-base extended on its outer end only and formed integral therewith and adapted to have the spring directly supporting the car-body without suspending-links mounted thereon, said yoke-pedestal being constructed to embrace and hold a journal-box and permitting its removal from the lower end of the yoke, substantially as described.

3. The combination, in a motor truck-frame, of pedestals having each an extended spring-base formed in one piece therewith and on its outer end only, single wheel-pieces connecting said pedestals in pairs at the sides of the frame, a central cross-sill connecting the wheel-pieces for supporting the motor, and end cross-sills connecting the spring-base extensions outside of the wheels of the truck, substantially as described.

4. The combination, in a motor truck-frame, of yoke-pedestals adapted to embrace and hold journal-boxes removable from the lower ends of the yokes thereof, said pedestals having each an extended spring-base on its outer end only and integral therewith, the car-supporting springs located on said extensions, and a single wheel-piece made in the form of an I-beam at each side of the frame, rigidly connecting said pedestals, substantially as described.

5. A car-truck pedestal having upon its outer end an arm forming an extended spring-base and upon its inner end an arm to connect with the wheel-piece and provided with an intermediate yoke to embrace and hold the removable journal-box, in combination with springs located only on the said extended spring base-arm of the pedestal, substantially as described.

6. The combination of the truck-wheels, the journal, journal-boxes, and the pedestals extended beyond said journal-boxes to carry the springs upon which the car is mounted, located on said extended portions, with an elastic concussion-seat located directly over the said journal-box, whereby the extended portion of the pedestal is relieved from excessive shocks from obstacles on the track, &c., substantially as described.

7. The side or wheel pieces rigidly uniting the yoke-pedestals and made each in the form of an I-beam, in combination with the yoke-pedestals and the spring-supports arranged in such manner that no part of the weight of the car-body will rest on the central portion of said side or wheel pieces, substantially as described.

8. A motor truck-frame composed of four yoke-pedestals, each formed integral with a spring-extension on its outer end, each of said pedestals being adapted by its yoke form to embrace and hold the journal-box removable from its lower end and each having an arm formed on its inner end, through which it is attached to a short wheel-piece, and an end sill extending across from one spring-extension to the other at each end of the frame, said cross-sills being rigidly secured to the ends of said spring-extensions, in combination with the springs located on the spring-extensions of said pedestals, whereby a long spring-base for the car-body and a short wheel-base for the truck are obtained, substantially as described.

In testimony whereof I have hereunto set my hand this 21st day of February, A. D. 1890.

MOSES G. HUBBARD.

Witnesses:
REX. M. SMITH,
H. J. ENNIS.